US012594700B2

(12) United States Patent
Weikard et al.

(10) Patent No.: US 12,594,700 B2
(45) Date of Patent: Apr. 7, 2026

(54) COATINGS FROM POLYISOCYANURATE COATINGS (RIM) AND THEIR USE IN INJECTION MOLDING PROCESSES

(71) Applicant: Covestro Deutschland AG, Leverkusen (DE)

(72) Inventors: Jan Weikard, Leverkusen (DE); Yvonne Reimann, Frechen (DE); Florian Golling, Dortmund (DE); Frank Richter, Leverkusen (DE); Michael Glawe, Solingen (DE); Richard Meisenheimer, Cologne (DE); Holger Mundstock, Wermelskirchen (DE); Dirk Achten, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 18/001,083

(22) PCT Filed: Jun. 25, 2021

(86) PCT No.: PCT/EP2021/067488
§ 371 (c)(1),
(2) Date: Dec. 8, 2022

(87) PCT Pub. No.: WO2022/002787
PCT Pub. Date: Jan. 6, 2022

(65) Prior Publication Data

US 2023/0211530 A1 Jul. 6, 2023

(30) Foreign Application Priority Data

Jul. 2, 2020 (EP) .................................... 20183622

(51) Int. Cl.
*B29C 45/14* (2006.01)
*B29C 37/00* (2006.01)
(Continued)

(52) U.S. Cl.
CPC .... *B29C 45/14336* (2013.01); *B29C 37/0028* (2013.01); *B29C 45/0001* (2013.01);
(Continued)

(58) Field of Classification Search
CPC .. C08G 18/022; C08G 18/027; C08G 18/792; C08G 2120/00; C08G 18/092; B29C 37/0028; B29C 2045/0079
See application file for complete search history.

(56) References Cited

U.S. PATENT DOCUMENTS 3,487,080 A 12/1969 Matsui et al.
3,996,223 A 12/1976 Gupta et al.
(Continued)

FOREIGN PATENT DOCUMENTS

DE 2414413 A1 10/1975
EP 0013880 A1 8/1980
(Continued)

OTHER PUBLICATIONS

Laas, H.J. et al., J. Prakt. Chem. 336 (1994), pp. 185-200.
(Continued)

*Primary Examiner* — Alison L Hindenlang
*Assistant Examiner* — Debjani Roy
(74) *Attorney, Agent, or Firm* — The Webb Law Firm

(57) ABSTRACT

The present invention relates to the use of polyisocyanate compositions and trimerization catalysts for production of coatings by reaction injection molding. The present disclosure also describes the coatings obtained by the use. The correspondingly coated workpieces are also described in this disclosure. A method for coating workpieces by reaction injection molding is also described herein.

16 Claims, 1 Drawing Sheet

A

B

C

D

(51) Int. Cl.
*B29C 45/00* (2006.01)
*B29K 75/00* (2006.01)

(52) U.S. Cl.
CPC .......... *B29C 45/0053* (2013.01); *B29C 45/14* (2013.01); *B29C 45/1418* (2013.01); *B29C 2045/0079* (2013.01); *B29C 2045/14286* (2013.01); *B29K 2075/00* (2013.01)

(56) References Cited

U.S. PATENT DOCUMENTS

| | | | | |
|---|---|---|---|---|
| 4,040,992 | A | 8/1977 | Bechara et al. | |
| 4,081,578 | A * | 3/1978 | van Essen | C08G 18/10 264/296 |
| 4,255,569 | A | 3/1981 | Mueller et al. | |
| 4,265,798 | A | 5/1981 | Mishra | |
| 4,288,586 | A | 9/1981 | Bock et al. | |
| 4,299,924 | A | 11/1981 | Nomura et al. | |
| 4,324,879 | A | 4/1982 | Bock et al. | |
| 4,379,905 | A | 4/1983 | Stemmler et al. | |
| 4,419,513 | A | 12/1983 | Breidenbach et al. | |
| 4,487,928 | A | 12/1984 | Richter et al. | |
| 4,604,418 | A | 8/1986 | Shindo et al. | |
| 4,788,310 | A | 11/1988 | Stein et al. | |
| 4,789,705 | A | 12/1988 | Kase et al. | |
| 4,826,915 | A | 5/1989 | Stein et al. | |
| 4,837,359 | A | 6/1989 | Woyner et al. | |
| 4,879,164 | A * | 11/1989 | Younes | B29C 39/00 428/209 |
| 4,960,848 | A | 10/1990 | Scholl et al. | |
| 4,994,541 | A | 2/1991 | Dell et al. | |
| 5,013,838 | A | 5/1991 | Scholl | |
| 5,064,960 | A | 11/1991 | Pedain et al. | |
| 5,076,958 | A | 12/1991 | Pedain et al. | |
| 5,489,663 | A | 2/1996 | Brandt et al. | |
| 5,716,678 | A * | 2/1998 | Rockrath | C09D 133/066 524/561 |
| 5,914,383 | A | 6/1999 | Richter et al. | |
| 6,090,939 | A | 7/2000 | Richter et al. | |
| 6,107,484 | A | 8/2000 | Richter et al. | |
| 6,613,863 | B2 | 9/2003 | Kohlstruk et al. | |
| 6,762,243 | B2 | 7/2004 | Stender et al. | |
| 7,001,973 | B2 | 2/2006 | Kohlstruk et al. | |
| 7,956,209 | B2 | 6/2011 | Laas et al. | |
| 8,119,799 | B2 | 2/2012 | Binder et al. | |
| 8,658,752 | B2 | 2/2014 | Groenewolt et al. | |
| 8,742,166 | B2 | 6/2014 | Lucas et al. | |
| 8,987,404 | B2 | 3/2015 | Flosbach et al. | |
| 9,017,818 | B2 | 4/2015 | Groenewolt et al. | |
| 9,850,338 | B2 | 12/2017 | Richter | |
| 10,100,222 | B2 | 10/2018 | Groenewolt et al. | |
| 10,167,358 | B2 | 1/2019 | Richter | |
| 10,179,830 | B2 | 1/2019 | Laas et al. | |
| 10,717,805 | B2 | 7/2020 | Matner et al. | |
| 10,752,723 | B2 | 8/2020 | Laas et al. | |
| 11,390,707 | B2 | 7/2022 | Laas et al. | |
| 2003/0009054 | A1* | 1/2003 | Kohlstruk | C08G 18/022 560/351 |
| 2003/0027921 | A1 | 2/2003 | Speier et al. | |
| 2005/0080259 | A1 | 4/2005 | Revelant et al. | |
| 2006/0113703 | A1 | 6/2006 | Wobbe et al. | |
| 2006/0155095 | A1 | 7/2006 | Daussin et al. | |
| 2009/0234091 | A1* | 9/2009 | Richter | C08G 18/166 528/51 |
| 2011/0082273 | A1 | 4/2011 | Laas et al. | |
| 2012/0100380 | A1* | 4/2012 | Groenewolt | C08G 18/778 427/407.1 |
| 2015/0125704 | A1 | 5/2015 | Dries et al. | |
| 2017/0274564 | A1* | 9/2017 | Wade | C08G 18/44 |
| 2018/0134835 | A1* | 5/2018 | Laas | C08G 18/027 |
| 2018/0355091 | A1 | 12/2018 | Laas et al. | |
| 2019/0322894 | A1* | 10/2019 | McCanna | B29C 67/246 |
| 2020/0332147 | A1 | 10/2020 | Achten et al. | |

FOREIGN PATENT DOCUMENTS

| | | | |
|---|---|---|---|
| EP | 0100129 | A1 | 2/1984 |
| EP | 0443167 | A1 | 8/1991 |
| EP | 0671426 | A1 | 9/1995 |
| EP | 0896009 | A1 | 2/1999 |
| EP | 2883895 | A1 | 6/2015 |
| EP | 3760658 | A1 | 1/2021 |
| GB | 809809 | A | 3/1959 |
| GB | 1145952 | A | 3/1969 |
| GB | 1244416 | A | 9/1971 |
| GB | 1386399 | A | 3/1975 |
| GB | 1391066 | A | 4/1975 |
| GB | 2221465 | A | 2/1990 |
| GB | 2222161 | A | 2/1990 |
| WO | 2008074489 | A1 | 6/2008 |
| WO | 2008074490 | A1 | 6/2008 |

OTHER PUBLICATIONS

Siefken, W., Justus Liebigs Annalen der Chemie Band 562 (1949), pp. 75-136.
European Polymer Journal, vol. 16, pp. 147-148 (1979).
Saunders J. H. and Frisch, K. C., Polyurethanes Chemistry and Technology,pp. 94 ff (1962).
International Search Report, PCT/EP2021/067488, date of mailing: Sep. 15, 2021, Authorized officer: Peter Mans.

* cited by examiner

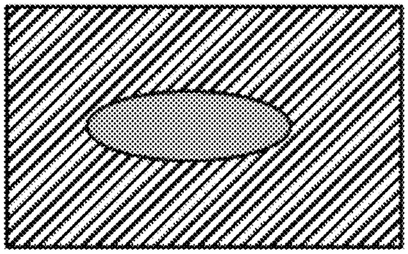
A
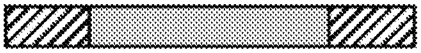
B
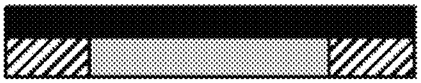
C
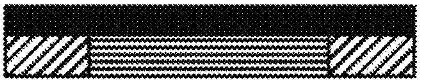
D

COATINGS FROM POLYISOCYANURATE COATINGS (RIM) AND THEIR USE IN INJECTION MOLDING PROCESSES

CROSS-REFERENCE TO RELATED APPLICATIONS

This application is the United States national phase of International Application No. PCT/EP2021/067488 filed Jun. 25, 2021, and claims priority to European Patent Application No. 20183622.8 filed Jul. 2, 2020, the disclosures of which are hereby incorporated by reference in their entireties.

BACKGROUND

Field of the Invention

The present invention relates to the use of polyisocyanate compositions and trimerization catalysts for production of coatings by reaction injection molding, to the coatings obtained by the use and to correspondingly coated workpieces.

Description of Related Art

The crosslinking of polyisocyanates to form polyisocyanurate plastics is described, for example, in WO 2016/170058 or WO 2016/170059. WO 2018/073303 describes the production of coatings from reaction mixtures having a large excess of isocyanate groups over isocyanate-reactive groups.

A well-known process for buildup of coatings is reaction injection molding. This comprises introducing a workpiece to be coated into a mold having dimensions such that a cavity having a width corresponding to the layer thickness of the coating to be produced is present between the inside of the mold and the surface of the workpiece. This process offers manufacturing advantages in the production of workpieces since injection of the coating composition into a mold can be effected more easily and quickly than the buildup of a coating by spraying, immersing or painting. This is especially true when the workpiece to be coated has a relatively complex three-dimensional shape. Reaction injection molding may particularly advantageously be combined with production of a plastic article to be coated when the plastic article is produced in a first mold and then transferred directly into a further mold in which the coating is applied. It is also possible to alter the geometry of the first mold, for example by displacing part of the mold, such that a cavity for the coating composition is formed between the workpiece and the inside of the mold. Hitherto, industrial applications have especially employed two processes for reaction injection molding:

In one process polyurethane coatings are produced by injection of a mixture of a polyol, a polyisocyanate and a urethanization catalyst into the gap. To achieve a sufficiently short cycle times, systems that undergo rapid curing are required. This requires the use of catalysts of high activity in very large usage amounts, especially when using aliphatic isocyanates and hydroxyl compounds. These large amounts of highly active catalysts can reduce the lifetime of the coating since they remain in the product and often also catalyse hydrolysis or other decomposition processes which, in the long run, destroy the coating. In addition, realizing uniform mixing of a multi-component and rapid-curing system in a narrow gap is technically challenging, especially so if components having poor compatibility with one another such as trimers of hexamethylene diisocyanate and branched polyester polyols are to be employed. Furthermore, if the correct mixing ratio of the reactants is not maintained the material properties deteriorate, for example incompletely reacted have the result that demolding is not possible without residues on the mold.

The other process is based on the formation of polyureas. The required high reaction rates are quite easily achievable in this case due to the high reactivity of isocyanates relative to amines. However, the coatings produced in this way are less scratch resistant than comparable polyurethane coatings and therefore unsuitable for quite a number of applications.

There is therefore a need for a coating system for reaction injection molding which allows short cycle times through rapid curing without large amounts of catalysts, is insensitive to mixing errors and thus allows production of coatings having superior performance properties.

SUMMARY OF THE INVENTION

This object is achieved by the embodiments disclosed in the claims and in the description hereinbelow.

In a first embodiment, the present invention relates to the use of a reaction mixture having a molar ratio of isocyanate groups to isocyanate-reactive groups of at least 3:1 for coating workpieces by reaction injection molding, wherein the reaction mixture contains a) at least one polyisocyanate composition A and b) at least one trimerization catalyst B and at least 30 mol % of the free isocyanate groups present in the reaction mixture are converted into isocyanurate groups.

DESCRIPTION OF THE INVENTION

Reaction Mixture

The reaction mixture according to the invention contains the components defined above in a mixing ratio which allows curing of the polyisocyanate A to afford a polyisocyanurate plastic. The components are in the mixed state and are reactive at the elevated temperature defined hereinbelow in the present application.

The molar ratio of isocyanate groups to isocyanate-reactive groups in the reaction mixture is at least 3:1, preferably at least 5:1. The term "isocyanate-reactive groups" is in the present application to be understood as meaning epoxy, hydroxyl, carboxyl, amino and thiol groups. The study on which the present invention is based has shown that reaction mixtures having a stoichiometric ratio of isocyanate groups to isocyanate-reactive groups of at least 3:1 have noticeably better performance properties than reaction mixtures not reaching this value.

These properties are mediated by the resulting isocyanurate groups. It is therefore the case that in a preferred embodiment of the present invention, at least 40 mol %, preferably at least 50 mol % and most preferably at least 60 mol % of the free isocyanate groups present in the reaction mixture are converted into isocyanurate groups.

If the viscosity of the reaction mixture is too high for the use, solvents may be added to adjust the viscosity. A solvent is characterized in that it has no isocyanate-reactive groups. A solvent can escape from the coating but may also remain in the film and function as a plasticizer therein. Suitable solvents are the solvents known to those skilled in the art for diluting polyisocyanates, preferably aliphatic acetates, aromatic hydrocarbons, esters, ethers and polyethers, glycol ethers and water. Water, butyl acetate, ethyl acetate, 1-methoxy-2-propyl acetate, butanone, solvent naphtha, xylene and toluene are particularly preferred. However, since organic solvents containing neither isocyanate groups nor isocyanate-reactive groups are liberated from the coating the content of organic solvents in the reaction mixture is preferably limited. The reaction mixture according to the invention therefore contains not more than 10% by weight, preferably not more than 5% by weight and most preferably not more than 2% by weight, of organic solvents containing neither isocyanate groups nor isocyanate-reactive groups.

The viscosity of the reaction mixture in use is preferably not more than 10 000 mPas, preferably not more than 5000 mPas, yet more preferably not more than 2500 mPas and most preferably 1000 mPas at the injection temperature determined according to DIN EN ISO 3219/B (Oct. 1, 1994 edition) at a shear rate of 100 $s^{-1}$. Typical injection temperatures are 20-140° C., preferably 30-100° C., particularly preferably 40-90° C. and very particularly preferably 50-60° C. If the reaction mixture contains oligomeric polyisocyanates as defined hereinbelow it may have a viscosity in excess of the abovementioned values. In these cases the viscosity can be reduced by using monomeric polyisocyanates as reactive diluents.

Polyisocyanate Composition A

The term "polyisocyanate composition A" refers to the entirety of all compounds present in the reaction mixture that contain at least one isocyanate group per molecule. Since the curing of the reaction mixture is based on the crosslinking of isocyanate groups with one another it is essential to the invention that the polyisocyanate composition A comprises a sufficiently large proportion of compounds having on average at least two isocyanate groups per molecule to bring about a crosslinking of the reaction mixture. However, provided this criterion is met, the presence of compounds having on averageone isocyanate group per molecule is harmless.

The term "polyisocyanate" as used here is a collective term for compounds containing two or more isocyanate groups (this is understood by the person skilled in the art to mean free isocyanate groups of the general structure —N═C═O) in the molecule. The simplest and most important representatives of these polyisocyanates are the diisocyanates. These have the general structure O═C═N—R—N═C═O where R typically represents aliphatic, alicyclic, araliphatic and/or aromatic radicals. In the present application the term "polyisocyanate A" refers to the entirety of all compounds present in the reaction mixture which have on average at least two isocyanate groups per molecule. Polyisocyanate A may thus be composed of a single polyisocyanate. However, it may also be a mixture of a plurality of different polyisocyanates. In the context of the embodiments defined hereinbelow polyisocyanate A may also contain additions of isocyanates having an average functionality of less than two.

Polyisocyanates are used to produce a multitude of polymers (e.g. polyurethanes, polyureas and polyisocyanurates) and low molecular weight compounds (for example those having uretdione, isocyanurate, allophanate, biuret, iminooxadiazinedione and/or oxadiazinetrione structure).

In the present application the term "polyisocyanates" refers to both monomeric and/or oligomeric polyisocyanates. For the understanding of many aspects of the invention, however, it is important to distinguish between monomeric diisocyanates and oligomeric polyisocyanates. Where reference is made in the present application to "oligomeric polyisocyanates", this means polyisocyanates formed from at least two monomeric diisocyanate molecules, i.e. compounds that constitute or contain a reaction product formed from at least two monomeric diisocyanate molecules.

The production of oligomeric polyisocyanates from monomeric diisocyanates is presently also referred to as modification of monomeric diisocyanates. This "modification" as used here means the reaction of monomeric diisocyanates, optionally with further isocyanate-reactive molecules, to afford oligomeric polyisocyanates having uretdione, isocyanurate, allophanate, biuret, iminooxadiazinedione and/or oxadiazinetrione structure.

Thus for example hexamethylene 1,6-diisocyanate (HDI) is a "monomeric diisocyanate" since it contains two isocyanate groups and is not a reaction product of at least two polyisocyanate molecules:

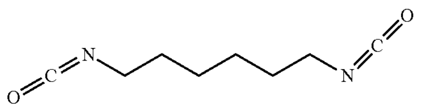

HDI

By contrast, reaction products of at least two HDI molecules which still have at least two isocyanate groups are "oligomeric polyisocyanates" in the context of the invention. Proceeding from monomeric HDI, representatives of such "oligomeric polyisocyanates" include for example HDI isocyanurate and HDI biuret which are each constructed from three monomeric HDI molecules:

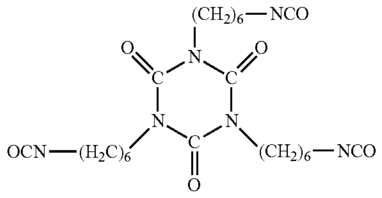

HDI isocyanurate

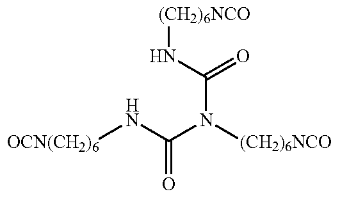

HDI biuret (idealized structural formulae)

It is preferable when the proportion by weight of isocyanate groups based on the total amount of the polyisocyanate composition A is at least 5% by weight. It is more preferably at least 10% by weight.

In principle, monomeric and oligomeric polyisocyanates are equally suitable for use in the reaction mixture according to the invention. Consequently, the polyisocyanate composition A may consist essentially of monomeric polyisocyanates or essentially of oligomeric polyisocyanates. However, it may alternatively comprise oligomeric and monomeric polyisocyanates in any desired mixing ratios.

In a preferred embodiment of the invention, the polyisocyanate composition A used as reactant is low in monomers (i.e. low in monomeric diisocyanates) and already contains oligomeric polyisocyanates. The terms "low in monomers"

and "low in monomeric diisocyanates" are here used synonymously in relation to the polyisocyanate composition A.

Particularly useful results are obtained when the polyisocyanate composition A has a proportion of monomeric diisocyanates of not more than 20% by weight, in particular not more than 15% by weight or not more than 10% by weight, in each case based on the total weight of the polyisocyanate composition A. It is preferable when the polyisocyanate composition A has a content of monomeric diisocyanates of not more than 5% by weight, especially not more than 2.0% by weight, more preferably not more than 1.0% by weight, based in each case on the weight of the polyisocyanate composition A. Particularly simple and reliable processing is ensured when the polyisocyanate composition A is essentially free from monomeric diisocyanates. In this context, essentially free is to be understood as meaning that the content of monomeric diisocyanates is not more than 0.5% by weight, particularly preferably even below 0.10%, based on the weight of the polyisocyanate composition A.

In a particularly preferred embodiment of the invention, the polyisocyanate composition A consists entirely or to an extent of at least 80%, 85%, 90%, 95%, 98%, 99% or 99.5% by weight, in each case based on the weight of the polyisocyanate composition A, of oligomeric polyisocyanates. Preference is given here to a content of oligomeric polyisocyanates of at least 99% by weight. This content of oligomeric polyisocyanates relates to the polyisocyanate composition A as provided. In other words, the oligomeric polyisocyanates are not formed as an intermediate during the process according to the invention, but are already present in the polyisocyanate composition A used as reactant upon commencement of the reaction.

Polyisocyanate compositions which have a low level of monomers or are essentially free of monomeric isocyanates can be obtained by conducting, after the actual modification reaction, in each case, at least one further process step for removal of the unconverted excess monomeric diisocyanates. This removal of monomers can be effected in a particularly practical manner by processes known per se, preferably by thin-film distillation under high vacuum or by extraction with suitable solvents that are inert toward isocyanate groups, for example aliphatic or cycloaliphatic hydrocarbons such as pentane, hexane, heptane, cyclopentane or cyclohexane.

In a preferred embodiment of the invention, the polyisocyanate A is obtained by modifying monomeric diisocyanates with subsequent removal of unconverted monomers.

However, in a particular embodiment of the invention, a low-monomer polyisocyanate composition A contains an outside monomeric diisocyanate. In this context, "outside monomeric diisocyanate" means that it differs from the monomeric diisocyanates which have been used for production of the oligomeric polyisocyanates present in the polyisocyanate composition A.

An addition of outside monomeric diisocyanate may be advantageous for achieving specific technical effects, for example a particular hardness. Results of particular practical relevance are obtained when the isocyanate A has a proportion of outside monomeric diisocyanates of not more than 50% by weight, especially not more than 30% by weight or not more than 15% by weight, based in each case on the weight of the polyisocyanate composition A. It is preferable when the polyisocyanate composition A has a content of outside monomeric diisocyanate of not more than 10% by weight, preferably not more than 2.0% by weight, more preferably not more than 1.0% by weight, based in each case on the weight of the polyisocyanate composition A.

In a further particular embodiment of the process according to the invention the polyisocyanate composition A contains monomeric monoisocyanates or monomeric isocyanates having an isocyanate functionality greater than two, i.e. having more than two isocyanate groups per molecule. The addition of monomeric isocyanates having an isocyanate functionality greater than two has proven advantageous in order to influence the network density of the material. Particularly useful results are obtained when the polyisocyanate composition A has a proportion of monomeric diisocyanates having an isocyanate functionality greater than two in the polyisocyanate composition A of not more than 20% by weight, especially not more than 15% by weight or not more than 10% by weight, in each case based on the weight of the polyisocyanate composition A. Preferably, the polyisocyanate composition A has a content of monomeric monoisocyanates or monomeric isocyanates having an isocyanate functionality greater than two of not more than 5% by weight, especially not more than 2.0% by weight, more preferably not more than 1.0% by weight, based in each case on the weight of the polyisocyanate composition A. It is preferable when no monomeric monoisocyanate or monomeric isocyanate having an isocyanate functionality greater than two is used in the trimerization reaction according to the invention. Examples of monomeric isocyanates having an isocyanate functionality >2 are for example triisocyanatononane and PMDI.

According to the invention the oligomeric polyisocyanates may in particular comprise uretdione, isocyanurate, allophanate, biuret, iminooxadiazinedione and/or oxadiazinetrione structures. In one embodiment of the invention, the oligomeric polyisocyanates have at least one of the following oligomeric structure types or mixtures thereof:

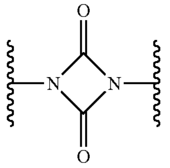

Uretdion

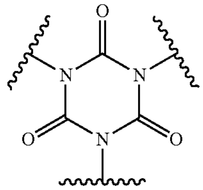

Isocyanurat

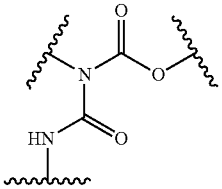

Allophanat

-continued

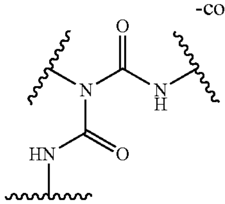

Biuret

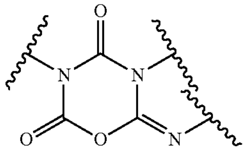

Iminooxadiazindion

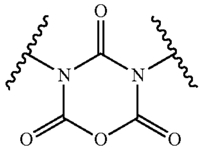

Oxadiazintrion

In a preferred embodiment of the invention, a polyisocyanate composition A is employed whose isocyanurate structure proportion is at least 50 mol %, preferably at least 60 mol %, more preferably at least 70 mol %, yet more preferably at least 80 mol %, yet still more preferably at least 90 mol % and especially preferably at least 95 mol % based on the sum of the oligomeric structures from the group consisting of uretdione, isocyanurate, allophanate, biuret, iminooxadiazinedione and oxadiazinetrione structures present in the polyisocyanate composition component A.

In a further embodiment of the invention, in the process according to the invention, a polyisocyanate composition A containing, as well as the isocyanurate structure, at least one further oligomeric polyisocyanate having uretdione, biuret, allophanate, iminooxadiazinedione and oxadiazinetrione structure and mixtures thereof is used.

The proportions of uretdione, isocyanurate, allophanate, biuret, iminooxadiazinedione and/or oxadiazinetrione structure in the polyisocyanate composition A may be determined for example by NMR spectroscopy. Preferably employable here is 13C NMR spectroscopy, preferably in proton-decoupled form, since the oligomeric structures mentioned give characteristic signals.

Irrespective of the underlying oligomeric structure (uretdione, isocyanurate, allophanate, biuret, iminooxadiazinedione and/or oxadiazinetrione structure), an oligomeric polyisocyanate composition A for use in the process according to the invention preferably has a (mean) NCO functionality of 2.0 to 5.0, preferably of 2.3 to 4.5.

Particularly useful results are obtained when the polyisocyanate composition A to be used in accordance with the invention has a content of isocyanate groups of 8.0% to 28.0% by weight, preferably of 14.0% to 25.0% by weight, in each case based on the weight of the polyisocyanate composition A.

Production processes for the oligomeric polyisocyanates having a uretdione, isocyanurate, allophanate, biuret, iminooxadiazinedione and/or oxadiazinetrione structure for use in the polyisocyanate composition A) according to the invention are described, for example, in J. Prakt. Chem. 336 (1994) 185-200, in DE-A 1 670 666, DE-A 1954 093, DE-A 2 414 413, DE-A 2 452 532, DE-A 2 641 380, DE-A 3 700 209, DE-A 3 900 053 and DE-A 3 928 503 or in EP-A 0 336 205, EP-A 0 339 396 and EP-A 0 798 299.

In an additional or alternative embodiment of the invention, the polyisocyanate composition A is defined in that it contains oligomeric polyisocyanates which have been obtained from monomeric diisocyanates, irrespective of the nature of the modification reaction used, with observation of an oligomerization level of 5% to 45%, preferably 10% to 40%, particularly preferably 15% to 30%. “Oligomerization level” is understood here to mean the percentage of isocyanate groups originally present in the starting mixture which are consumed during the production process to form urethane, uretdione, isocyanurate, allophanate, biuret, iminooxadiazinedione and/or oxadiazinetrione structures.

Suitable polyisocyanates for production of the polyisocyanate composition A to be employed according to the invention and the monomeric and/or oligomeric polyisocyanates present therein are any desired polyisocyanates obtainable in various ways, for example by phosgenation in the liquid or gas phase or by a phosgene-free route, for example by thermal urethane cleavage. Particularly good results are established when the polyisocyanates are monomeric diisocyanates. Preferred monomeric diisocyanates are those having a molecular weight in the range from 140 to 400 g/mol, having aliphatically, cycloaliphatically, araliphatically and/or aromatically bonded isocyanate groups, for example 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (xylylene diisocyanate; XDI), 1,3- and 1,4-bis(1-isocyanato-1-methylethyl)benzene (TMXDI) and bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), 1,5-diisocyanatonaphthalene and any desired mixtures of such diisocyanates. Further diisocyanates that are likewise suitable may additionally be found for example in Justus Liebigs Annalen der Chemie, volume 562 (1949) pp. 75-136.

Suitable monomeric monoisocyanates which can optionally be used in the polyisocyanate composition A are, for example, n-butyl isocyanate, n-amyl isocyanate, n-hexyl isocyanate, n-heptyl isocyanate, n-octyl isocyanate, undecyl isocyanate, dodecyl isocyanate, tetradecyl isocyanate, cetyl isocyanate, stearyl isocyanate, cyclopentyl isocyanate, cyclohexyl isocyanate, 3- or 4-methylcyclohexyl isocyanate or any desired mixtures of such monoisocyanates. An example of a monomeric isocyanate having an isocyanate functionality greater than two which can optionally be added to the isocyanate component A is 4-isocyanatomethyloctane 1,8-diisocyanate (triisocyanatononane; TIN).

In one embodiment of the invention, the polyisocyanate composition A contains not more than 30% by weight, especially not more than 20% by weight, not more than 15% by weight, not more than 10% by weight, not more than 5% by weight or not more than 1% by weight, based in each case on the weight of the polyisocyanate composition A, of aromatic polyisocyanates. As used here, "aromatic polyisocyanate" means a polyisocyanate having at least one aromatically bonded isocyanate group.

Aromatically bonded isocyanate groups are understood to mean isocyanate groups bonded to an aromatic hydrocarbyl radical.

In a further embodiment of the invention, the polyisocyanate composition A consists to an extent of at least 70%, 80%, 85%, 90%, 95%, 98% or 99% by weight, in each case based on the weight of the polyisocyanate composition A, of polyisocyanates having exclusively aliphatically and/or cycloaliphatically bonded isocyanate groups. Practical experiments have shown that particularly good results can be achieved with polyisocyanate compositions A in which the isocyanates present therein comprise exclusively aliphatically and/or cycloaliphatically bonded isocyanate groups.

Aliphatically and cycloaliphatically bonded isocyanate groups are understood to mean isocyanate groups bonded to an aliphatic hydrocarbyl radical and a cycloaliphatic hydrocarbyl radical respectively. In another preferred embodiment of the process of the invention, a polyisocyanate A consisting of or comprising one or more oligomeric polyisocyanates is used, wherein the one or more oligomeric polyisocyanates have exclusively aliphatically and/or cycloaliphatically bonded isocyanate groups.

In a particularly preferred embodiment of the process of the invention, a polyisocyanate composition A is used which consists of or contains one or more oligomeric polyisocyanates, where the one or more oligomeric polyisocyanates is/are formed on the basis of 1,4-diisocyanatobutane (BDI), 1,5-diisocyanatopentane (PDI), 1,6-diisocyanatohexane (HDI), isophorone diisocyanate (IPDI) or 4,4'-diisocyanatodicyclohexylmethane (H12MDI) or mixtures thereof.

Blocked Polyisocyanates

In one embodiment of the present invention, at least a portion of the isocyanates present in the polyisocyanate composition A is blocked. "Blocking" means that the isocyanate groups of a polyisocyanate have been reacted with a further compound, the blocking agent, and the blocked isocyanate groups therefore no longer exhibit the reactivity typical of free isocyanate groups. Only thermal activation of the blocked isocyanate leads to an increase in reactivity towards isocyanate-reactive groups or free isocyanate groups so that polymerization can take place. Suitable blocking agents are well known to those skilled in the art.

According to the invention, blocking agents used are at least one compound selected from the group consisting of alcohols, phenols, pyridinols, thiophenols, quinolinols, mercaptopyridines, quinolinols, amides, imides, imidazoles, imidazolines, lactams, oximes, pyrazoles, triazoles, malonic esters, acetoacetic esters, acetyl ketones and cyclopentanone 2-alkyl esters. Blocking is more preferably carried out with a compound selected from the group consisting of mercaptopyridines, quinolinols, amides, imides, imidazoles, imidazolines, lactams, oximes, pyrazoles, triazoles, malonic esters, acetoacetic esters, acetyl ketones and cyclopentanone 2-alkyl esters. It is very particularly preferable to use at least one cyclopentanone 2-alkyl ester.

Preferred lactams, amides and imides are selected from the group consisting of N-methylacetamide, acetanilide, γ-butyrolactam, ζ-enantholactam, δ-valerolactam, laurolactam, ε-caprolactam, δ-methyl-2-piperidone, 3,6-dialkyl-2,5-piperazidinones or phthalimides. A particularly preferred lactam is ε-caprolactam.

Preferred oximes are selected from the group consisting of 2-butanone oxime, 3-methyl-2-butanone oxime, 3,3-dimethyl-2-butanone oxime, 4-methyl-2-pentanone oxime, 5-methyl-2-hexanone oxime, 2-heptanone oxime, 4,6-dimethyl-2-heptanone oxime, 3-ethyl-2-none oxime, 2,4-dimethyl-3-pentanone oxime, 2,6-dimethyl-4-heptanone oxime, formaldoxime, acetophenone oxime, diethyl glyoxime, pentanone oxime, hexanone oxime, cyclohexanone oxime, 2,2,6,6-tetramethylcyclohexanone oxime, 2,2,4,4-tetramethylcyclobutane-1,3-dione-1-oxime and hydroxamic acid. A particularly preferred oxime is 2-butanone oxime.

Suitable phenols, quinolines and pyridinols include inter alia the esters of 2-hydroxybenzoic acid and 4-hydroxybenzoic acid, such as methyl 2-hydroxybenzoate, ethyl 2-hydroxybenzoate, 2-ethylhexyl 2-hydroxybenzoate, methyl 4-hydroxybenzoate, ethyl 4-hydroxybenzoate, benzyl 4-hydroxybenzoate or 2-ethylhexyl 4-hydroxybenzoate, 2-[(dimethylamino)methyl]phenol, 2-[(dimethylamino)methyl]-4-nonylphenol, phenol, 2,3,5-trimethylphenol, 2,3,6-trimethylphenol, 2,4,6-trimethylphenol, o-cresol, m-cresol, p-cresol, 2-tert-butylphenol, 4-tert-butylphenol, 2-hydroxymethyl acrylate, 2-hydroxyethyl acrylate, 2-hydroxymethyl methacrylate, 2-hydroxyethyl methacrylate, 2-hydroxyquinoline, 8-hydroxyquinoline, 2-hydroxypyridine, 3-hydroxypyridine, 2-hydroxymethylpyridine, 3-hydroxymethylpyridine, 2-chloro-3-hydroxypyridine and also para-cresol-formaldehyde resins and phenolic terpene resins.

Preferred phenols are selected from the group consisting of phenol, 2,3,5-trimethylphenol, 2,3,6-trimethylphenol, 2,4,6-trimethylphenol, o-cresol, m-cresol, p-cresol, 2-tert-butylphenol and 4-tert-butylphenol.

Suitable alcohols comprise for example linear and branched aliphatic alcohols such as isopropanol, n-butanol, sec-butanol, tert-butanol, n-pentanol, 2,2-dimethyl-1-propanol, n-hexanol, 2-ethylhexanol, 1-octanol or 2-octanol, cyclohexanol, furfuryl alcohol, monoethers of ethylene glycol such as 2-methoxyethanol, 2-ethoxyethanol, 2-propoxyethanol, 2-butoxyethanol, diethylene glycol monomethyl ether, diethylene glycol monoethyl ether, diethylene glycol monopropyl ether, diethylene glycol monobutyl ether or 2-(2-ethylhexyloxy)ethanol, N,N-dibutylglycolamide, N-hydroxysuccinimide, 2-morpholinoethanol, 2,2-dimethyl-4-hydroxymethyl-1,3-dioxolane, 12-hydroxystearic acid or 3-oxazolidineethanol.

Suitable imidazoles, imidazolines, pyrazoles and triazoles are for example 2-methylimidazole, 2-ethylimidazole, 2-isopropylimidazole, 2-ethyl-4-methylimidazole, 2,4-dimethylimidazoline, 4-methylimidazoline, 2-phenylimidazoline, 4-methyl-2-phenylimidazoline, 3-methylpyrazole, 3,5-dimethylpyrazole, 1,2,4-triazole or benzotriazole. A preferred pyrazole is 3,5-dimethylpyrazole. Malonic acid esters, acetoacetic acid esters and acetyl ketones include, for example, dimethyl malonate, diethyl malonate, diisopropyl malonate, tert-butyl methyl malonate, di-tert-butyl malonate, isopropylidene malonate, methyl acetoacetate, ethyl acetoacetate, isopropyl acetoacetate, tert-butyl acetoacetonate, 2-acetoacetoxyethyl methacrylate, 2,4-pentanedione (acetylacetone) or ethyl cyanoacetate. Preferred malonates are diethyl malonate and dimethyl malonate.

Preferred secondary amines are selected from the group consisting of diisopropylamine, dibutylamine, di-tert-butylamine, N-methyl-tert-butylamine, tert-butylbenzylamine, 2,2,4-trimethylhexamethyleneamine, 2,2,5-trimethylhexamethyleneamine, N-methylhexylamine, N-isopropylcyclohexylamine, dicyclohexylamine, bis(3,3,5-trimethylcyclohexyl)amine, 3-tert-butylaminomethylpropionate, piperidine, 2,6-dimethylpiperidine, 2,2,6,6-tetramethylpiperidine, 4-(dimethylamino)-2,2,6,6-tetramethylpiperidine, 2,2,6,6-tetramethyl-4-piperidonebis (2,2,6,6-tetramethylpiperidinyl)amine, N-methylaniline, diphenylamine or N-phenylnaphthalene.

Diisopropylamine, tetramethylpiperidine and N-methyl-tert-butylamine, tert-butylbenzylamine, n-dibutylamine and 3-tert-butylaminomethyl propionate are particularly preferred.

Preferred cyclopentanone 2-alkyl esters are cyclopentanone 2-methyl ester, cyclopentanone 2-ethyl ester, cyclopentanone 2-propyl ester, cyclopentanone 2-butyl ester and cyclopentanone 2-pentyl ester. Cyclopentanone 2-methyl ester is particularly preferred.

It is possible in accordance with the invention to use a mixture of two, three or more of the aforementioned compounds as blocking agents.

In a preferred embodiment of the present invention, the predominant portion of the isocyanate groups present in the polyisocyanate composition A is blocked. Particularly preferably at least 90% by weight, even more preferably at least 95% by weight and most preferably 98% by weight of the isocyanate groups present in the polyisocyanate composition A are blocked. It is very particularly preferable when the polyisocyanate composition A contains no detectable free isocyanate groups. Free isocyanate groups can be determined by means of IR spectroscopy. The NCO band is observed at 2700 $cm^{-1}$.

Silane-Modified Polyisocyanates

Silane modifications are employed in coatings in order for example to increase the hardness and/or the scratch resistance of the coating. If silane-modified isocyanates are used, both silane-functional groups and isocyanate groups are present in one molecule. The crosslinking of the silane groups with one another may be catalyzed but may also be effected via a post-curing, for example via atmospheric humidity. However, according to the invention formulations having silane-functional isocyanates are configured such that the first curing step already affords a coating which is demoldable and then achieves its ultimate hardness through post-crosslinking.

In a preferred embodiment the polyisocyanate composition A contains at least one silane-functional polyisocyanate, particularly preferably at least one silane-functional oligomeric polyisocyanate. These are compounds containing at least one silane group and at least 1 isocyanate groups.

The silane-functional oligomeric polyisocyanates are typically obtained by oligomerization of simple aliphatic, cycloaliphatic, araliphatic and/or aromatic monomeric diisocyanates as previously described as starting diisocyanates for the production of the oligomeric polyisocyanates in admixture with silicon-modified diisocyanates and/or isocyanatoalkylsilanes or by partial reaction of oligomeric polyisocyanates with isocyanate-reactive silicon-containing compounds. The terms "partial reaction with silicon-containing compounds" and "silicon-modified" are used interchangeably in the context of the invention and mean in particular that 1 to 99.9, preferably 5 to 80, particularly preferably 10 to 50, very particularly preferably 15 to 40, mol % of the isocyanate groups originally present in the oligomeric polyisocyanate or in the diisocyanate have been reacted with silicon-containing compounds. In other words the oligomeric, silane-functional polyisocyanates produced by partial reaction of oligomeric polyisocyanates with silicon-containing compounds have an isocyanate content of 99.0 to 0.1 mol %, preferably 95 to 20 mol %, particularly preferably 90 to 50 mol %, very particularly preferably 85 to 60 mol %, based on the originally present isocyanate groups of the oligomeric polyisocyanates.

Production processes for the oligomeric, silane-functional polyisocyanates having uretdione, isocyanurate, allophanate, biuret, iminooxadiazinedione and/or oxadiazinetrione structure to be used according to the invention in the low-monomer composition A) and obtainable by reaction of oligomeric polyisocyanates with isocyanate-reactive silicon-containing compounds are described for example in EP-A 1 273 640, WO-A 2008/074490, WO-A 2008/074489, WO-A 2014/086530, WO-A 2010/149236, WO-A 2009/156148.

Further oligomeric, silane-functional polyisocyanates also include for example the allophanate-containing and silane-containing polyisocyanates described in EP-A 2 014 692 and EP-A 2 305 691 that are obtainable by reaction of silane-containing hydroxyurethanes and/or hydroxyamides with excess amounts of monomeric diisocyanates.

The use of the thioallophanates described in WO 2015/189164 in the polyisocyanate composition A is also preferred, since these also have a high average isocyanate functionality at a high content of silane groups. These are compounds characterized by general formula (I), (I)

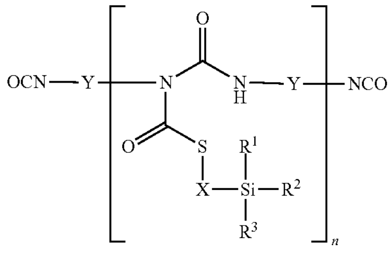

in which $R^1$, $R^2$ and $R^3$ are identical or different radicals and are each a saturated or unsaturated, linear or branched, aliphatic or cycloaliphatic or an optionally substituted aromatic or araliphatic radical having up to 18 carbon atoms, which may optionally contain up to 3 heteroatoms from the series of oxygen, sulfur and nitrogen, X is a linear or branched organic radical having at least 2 carbon atoms, Y is a linear or branched, aliphatic or cycloaliphatic, an araliphatic or aromatic radical having up to 18 carbon atoms and n is an integer from 1 to 20.

Also preferred is the use of silane-functional polyisocyanates obtained by reacting the polyisocyanates mentioned hereinabove as constituents of the polyisocyanate composition with silane-functional compounds, preferably silane-functional amines, aspartates, amides and thiols. Preferred silane functional amines are selected from the group consisting of compounds of formula (II), (Ill) and (IV).

(II)

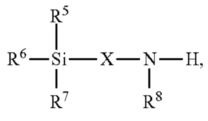

in which $R^5$, $R^6$ and $R^7$ are identical or different radicals and are each a saturated or unsaturated, linear or branched, aliphatic or cycloaliphatic or an optionally substituted aromatic or araliphatic radical which has up to 18 carbon atoms and may optionally contain up to 3 heteroatoms from the group of oxygen, sulfur and nitrogen, X is a linear or branched organic radical which has at least 2 carbon atoms and may optionally contain up to 2 imino groups (—NH—), and $R^8$ is hydrogen, a saturated or unsaturated, linear or branched, aliphatic or cycloaliphatic or an optionally substituted aromatic or araliphatic radical having up to 18 carbon atoms or a radical of the formula

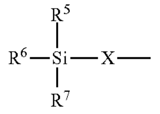

in which $R^5$, $R^6$, $R^7$ and X have the definition given above.

Suitable aminosilanes of general formula (II) are for example 3-aminopropyltrimethoxysilane, 3-aminopropyltriethoxysilane, 3-aminopropylmethyldimethoxysilane, 3-aminopropylmethyldiethoxysilane, 3-aminopropylethyldiethoxysilane, 3-aminopropyldimethylethoxysilane, 3-aminopropyldiisopropylethoxysilane, 3-aminopropyltripropoxysilane, 3-aminopropyltributoxysilane, 3-aminopropylphenyldiethoxysilane, 3-aminopropylphenyldimethoxysilane, 3-aminopropyltris(methoxyethoxyethoxy)silane, 2-aminoisopropyltrimethoxysilane, 4-aminobutyltrimethoxysilane, 4-aminobutyltriethoxysilane, 4-aminobutylmethyldimethoxysilane, 4-aminobutylmethyldiethoxysilane, 4-aminobutylethyldimethoxysilane, 4-aminobutylethyldiethoxysilane, 4-aminobutyldimethylmethoxysilane, 4-aminobutylphenyldimethoxysilane, 4-aminobutylphenyldiethoxysilane, 4-amino(3-methylbutyl)methyldimethoxysilane, 4-amino(3-methylbutyl)methyldiethoxysilane, 4-amino(3-methylbutyl)trimethoxysilane, 3-aminopropylphenylmethyl-n-propoxysilane, 3-aminopropylmethyldibutoxysilane, 3-aminopropyldiethylmethylsilane, 3-aminopropylmethylbis(trimethylsiloxy)silane, 11-aminoundecyltrimethoxysilane, N-methyl-3-aminopropyltrimethoxysilane, N-methyl-3-aminopropyltriethoxysilane, N-(n-butyl)-3-aminopropyltrimethoxysilane, N-(n-butyl)-3-aminopropyltriethoxysilane, N-(2-aminoethyl)-3-aminopropyltrimethoxysilane, N-(2-aminoethyl)-3-aminoisobutylmethyldimethoxysilane, N-(2-aminoethyl)-3-aminopropylmethyldimethoxysilane, N-(2-aminoethyl)-3-aminopropyltris(2-ethylhexoxy)silane, N-(6-aminohexyl)-3-aminopropyltrimethoxysilane, N-benzyl-N-(2-aminoethyl)-3-aminopropyltrimethoxysilane, bis(3-trimethoxysilylpropyl)amine, bis(3-triethoxysilylpropyl)amine, (aminoethylaminomethyl)phenethyltrimethoxysilane, N-vinylbenzyl-N-(2-aminoethyl)-3-aminopropylpolysiloxane, N-vinylbenzyl-N-(2-aminoethyl)-3-aminopropylpolysiloxane, 3-ureidopropyltriethoxysilane, 3-(m-aminophenoxy)propyltrimethoxysilane, m- and/or p-aminophenyltrimethoxysilane, 3-(3-aminopropoxy)-3,3-dimethyl-1-propenyltrimethoxysilane, 3-aminopropylmethylbis(trimethylsiloxy)silane, 3-aminopropyltris(trimethylsiloxy)silane, 3-aminopropylpentamethyldisiloxane or any desired mixtures of such aminosilanes.

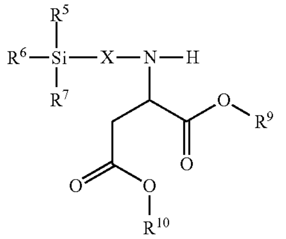

(III)

in which $R^5$, $R^6$ and $R^7$ have the definition given for formula (II),

X is a linear or branched organic radical having at least 2 carbon atoms and $R^9$ and $R^{10}$ independently of one another are saturated or unsaturated, linear or branched, aliphatic or cycloaliphatic or aromatic organic radicals which have 1 to 18 carbon atoms, are substituted or unsubstituted and/or have heteroatoms in the chain.

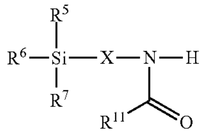

(IV)

in which $R^5$, $R^6$ and $R^7$ have the definition given for formula (II),

X is a linear or branched organic radical having at least 2 carbon atoms and $R^{11}$ is a saturated linear or branched, aliphatic or cycloaliphatic organic radical having 1 to 8 carbon atoms.

These aminosilanes of general formula (IV) are the known silane-functional alkylamides as obtainable, for example, by the process is disclosed in U.S. Pat. Nos. 4,788,310 and 4,826,915, by reacting aminosilanes bearing primary amino groups with alkyl alkylcarboxylates to eliminate alcohol.

Suitable production processes for the abovementioned amino-functional silanes are known to those skilled in the art and are described, for example, in European patent application having application Ser. No. 19/184,068.

Trimerization Catalyst B

The trimerization catalyst B contains at least one catalyst which brings about the trimerization of isocyanate groups to afford isocyanurates and/or to afford iminooxadiazinediones.

Suitable catalysts for the process according to the invention are, for example, simple tertiary amines, for example triethylamine, tributylamine, N,N-dimethylaniline, N-ethylpiperidine or N,N'-dimethylpiperazine. Suitable catalysts also include the tertiary hydroxyalkylamines described in GB 2 221 465, for example triethanolamine, N-methyldiethanolamine, dimethylethanolamine, N-isopropyldiethanolamine and 1-(2-hydroxyethyl)pyrrolidine, or the catalyst systems that are known from GB 2 222 161 and consist of mixtures of tertiary bicyclic amines, for example DBU, with simple low molecular weight aliphatic alcohols.

Likewise suitable as trimerization catalysts for the process of the invention are a multitude of different metal compounds. Suitable examples are the octoates and naphthenates of manganese, iron, cobalt, nickel, copper, zinc, zirconium, cerium or lead or mixtures thereof with acetates of lithium, sodium, potassium, calcium or barium that are described as catalysts in DE-A 3 240 613, the sodium and potassium salts of linear or branched alkanecarboxylic acids having up to 10 carbon atoms that are disclosed by DE-A 3 219 608, such as of propionic acid, butyric acid, valeric acid, caproic acid, heptanoic acid, caprylic acid, pelargonic acid, capric acid and undecyl acid, the alkali metal or alkaline earth metal salts of aliphatic, cycloaliphatic or aromatic mono- and polycarboxylic acids having 2 to 20 carbon atoms that are disclosed by EP-A 0 100 129, such as sodium benzoate or potassium benzoate, the alkali metal phenoxides disclosed by GB-PS 1 391 066 and GB-PS 1 386 399, such as sodium phenoxide or potassium phenoxide, the alkali metal and alkaline earth metal oxides, hydroxides, carbonates, alkoxides and phenoxides disclosed by GB 809 809, alkali metal salts of enolizable compounds and metal salts of weak aliphatic or cycloaliphatic carboxylic acids such as sodium methoxide, sodium acetate, potassium acetate, sodium acetoacetate, lead 2-ethylhexanoate, and lead naphthenate, the basic alkali metal compounds complexed with crown ethers or polyether alcohols that are disclosed by EP-A 0 056 158 and EP-A 0 056 159, such as complexed sodium carboxylates or potassium carboxylates, the pyrrolidinone potassium salt disclosed by EP-A 0 033 581, the mono- or polynuclear complex of titanium, zirconium and/or hafnium disclosed by application EP 13196508.9, such as zirconium tetra-n-butoxide, zirconium tetra-2-ethylhexanoate and zirconium tetra-2-ethylhexoxide, and tin compounds of the type described in European Polymer Journal, vol. 16, 147-148 (1979), such as dibutyltin dichloride, diphenyltin dichloride, triphenylstannanol, tributyltin acetate, tributyltin oxide, tin dioctoate, dibutyl(dimethoxy)stannane, and tributyltin imidazolate.

Further trimerization catalysts suitable for the process of the invention are, for example, the quaternary ammonium hydroxides known from DE-A 1 667 309, EP-A 0 013 880 and EP-A 0 047 452, for example tetraethylammonium hydroxide, trimethylbenzylammonium hydroxide, N,N-dimethyl-N-dodecyl-N-(2-hydroxyethyl)ammonium hydroxide, N-(2-hydroxyethyl)-N,N-dimethyl-N-(2,2'-dihydroxymethylbutyl)ammonium hydroxide and 1-(2-hydroxyethyl)-1,4-diazabicyclo[2.2.2]octane hydroxide (monoadduct of ethylene oxide and water onto 1,4-diazabicyclo[2.2.2]octane), the quaternary hydroxyalkylammonium hydroxides known from EP-A 37 65 or EP-A 10 589, for example N,N,N-trimethyl-N-(2-hydroxyethyl)ammonium hydroxide, the trialkylhydroxylalkylammonium carboxylates that are known from DE-A 2631733, EP-A 0 671 426, EP-A 1 599 526 and U.S. Pat. No. 4,789,705, for example N,N,N-trimethyl-N-2-hydroxypropylammonium p-tert-butylbenzoate and N,N,N-trimethyl-N-2-hydroxypropylammonium 2-ethylhexanoate, the quaternary benzylammonium carboxylates known from EP-A 1 229 016, for example N-benzyl-N,N-dimethyl-N-ethylammonium pivalate, N-benzyl-N,N-dimethyl-N-ethylammonium 2-ethylhexanoate, N-benzyl-N,N,N-tributylammonium 2-ethylhexanoate, N,N-dimethyl-N-ethyl-N-(4-methoxybenzyl) ammonium 2-ethylhexanoate or N,N,N-tributyl-N-(4-methoxybenzyl)ammonium pivalate, the tetrasubstituted ammonium $\alpha$-hydroxycarboxylates known from WO 2005/087828, for example tetramethylammonium lactate, the quaternary ammonium or phosphonium fluorides known from EP-A 0 339 396, EP-A 0 379 914 and EP-A 0 443 167, for example N-methyl-N,N,N-trialkylammonium fluorides with C8-C10-alkyl radicals, N,N,N,N-tetra-n-butylammonium fluoride, N,N,N-trimethyl-N-benzylammonium fluoride, tetramethylphosphonium fluoride, tetraethylphosphonium fluoride or tetra-n-butylphosphonium fluoride, the quaternary ammonium and phosphonium polyfluorides known from EP-A 0 798 299, EP-A 0 896 009 and EP-A 0 962 455, for example benzyltrimethylammonium hydrogen polyfluoride, the tetraalkylammonium alkylcarbonates which are known from EP-A 0 668 271 and are obtainable by reaction of tertiary amines with dialkyl carbonates, or betaine-structured quaternary ammonioalkyl carbonates, the quaternary ammonium hydrogencarbonates known from WO 1999/023128, for example choline bicarbonate, the quaternary ammonium salts which are known from EP 0 102 482 and are obtainable from tertiary amines and alkylating esters of phosphorus acids, examples of such salts being reaction products of triethylamine, DABCO or N-methylmorpholine with dimethyl methanephosphonate, or the tetrasubstituted ammonium salts of lactams that are known from WO 2013/167404, for example trioctylammonium caprolactamate or dodecyltrimethylammonium caprolactamate.

Further trimerization catalysts B suitable in accordance with the invention may be found, for example, in J. H. Saunders and K. C. Frisch, Polyurethanes Chemistry and Technology, p. 94 ff. (1962) and the literature cited therein.

Particular preference is given to carboxylates and phenoxides with metal or ammonium ions as counterion. Suitable carboxylates are the anions of all aliphatic or cycloaliphatic carboxylic acids, preferably those with mono- or polycarboxylic acids having 1 to 20 carbon atoms. Suitable metal ions are derived from alkali metals or alkaline earth metals, manganese, iron, cobalt, nickel, copper, zinc, zirconium, cerium, tin, titanium, hafnium or lead. Preferred alkali metals are lithium, sodium and potassium, particularly preferably sodium and potassium. Preferred alkaline earth metals are magnesium, calcium, strontium and barium.

Very particular preference is given to the octoate and naphthenate catalysts described in DE-A 3 240 613, these being octoates and naphthenates of manganese, iron, cobalt, nickel, copper, zinc, zirconium, cerium or lead, or mixtures thereof with acetates of lithium, sodium, potassium, calcium or barium.

Very particular preference is likewise given to sodium benzoate or potassium benzoate, to the alkali metal phenoxides known from GB-PS 1 391 066 and GB-PS 1 386 399, for example sodium phenoxide or potassium phenoxide, and to the alkali metal and alkaline earth metal oxides, hydroxides, carbonates, alkoxides and phenoxides that are known from GB 809 809.

If the trimerization catalyst B is poorly soluble or insoluble in the polyisocyanate composition A its activity can be facilitated or enhanced by addition of a solubilizer. Trimerization catalysts B based on alkali metal and alkaline earth metal oxides, hydroxides, carbonates or alkoxides preferably contain a polyether. This is especially preferred when the catalyst contains metal ions. Preferred polyethers are selected from the group consisting of crown ethers, diethylene glycol, polyethylene glycols and polypropylene glycols. It has been found to be of particular practical relevance in the process of the invention to use a trimerization catalyst B containing, as polyether, a polyethylene glycol or a crown ether, more preferably 18-crown-6 or 15-crown-5. The trimerization catalyst B preferably contains a polyethylene glycol having a number-average molecular weight of 100 to 1000 g/mol, preferably 300 g/mol to 500 g/mol and in particular 350 g/mol to 450 g/mol.

Very particular preference is given to the combination of the above-described carboxylates and phenoxides of alkali metals or alkaline earth metals with a polyether.

Furthermore, the trimerization catalysts described in EP 3 337 836 and WO2015/124504 are particularly suitable for the use according to the invention.

Isocyanate-Reactive Compound C

In a preferred embodiment the reaction mixture contains at least one isocyanate-reactive compound C. An "isocyanate-reactive compound" is a compound bearing at least one isocyanate-reactive group as defined hereinabove. The at least one isocyanate-reactive compound C is present in a ratio to the polyisocyanate composition A such that in the reaction mixture the claimed stoichiometric ratio of isocyanate groups to isocyanate-reactive groups is maintained. Isocyanate-reactive compounds C are preferably used as solvents for the trimerization catalyst B and/or as flexibilizing components. A "flexibilising component" lowers the Tg of a coating compared to a coating obtained from the same reaction mixture without addition of the flexibilising component.

Mono- or polyhydric alcohols, amino alcohols, amines and thiols are in principle suitable as isocyanate-reactive compound C. The aforementioned compounds preferably have an average functionality of at least 2 isocyanate-reactive groups per molecule.

Preferred amines are organic di- or polyamines preferably selected from the group consisting of 1,2-ethylenediamine, 1,2- and 1,3-diaminopropane, 1,4-diaminobutane, 1,6-diaminohexane, isophoronediamine, the isomer mixture of 2,2,4- and 2,4,4-trimethylhexamethylenediamine, 2-methylpentamethylenediamine, diethylenetriamine, 4,4-diaminodicyclohexylmethane, hydrazine hydrate, dimethylethylenediamine, polyethers modified with amino end groups and compounds of formula (V). The aforementioned compounds are preferably used as a flexibilizing component.

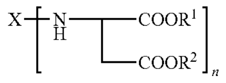

(V)

Here,

X is an n-valent radical inert towards isocyanate groups, as obtained by removing the primary amino groups from an organic amine of molecular weight range 60 to 6000 having n primary aliphatically and/or cycloaliphatically bonded amino groups, which optionally contains one or more heteroatoms and/or further functional groups reactive towards isocyanate groups and/or inert at temperatures up to 100° C., $R^1$ and $R^2$ are identical or different organic radicals having 1 to 18 carbon atoms and n is an integer >1.

Also preferred are amines containing at least one amino group and at least one hydroxyl group (amino alcohols). Such compounds are preferably selected from the group consisting of diethanolamine, 3-amino-1-methylaminopropane, 3-amino-1-ethylaminopropane, 3-amino-1-cyclohexylaminopropane, 3-amino-1-methylaminobutane, alkanolamines such as N-aminoethylethanolamine, ethanolamine, 3-aminopropanol and neopentanolamine. The aforementioned compounds are preferably used as a flexibilizing component.

All known monomeric and polymeric polyols may in principle be used individually or in admixture as a flexibilizing component. These are in particular the customary polyester polyols, polyether polyols, polyacrylate polyols and polycarbonate polyols known from polyurethane chemistry.

Suitable polyester polyols are preferably those having an average molecular weight, calculable from functionality and hydroxyl number, of 200 g/mol to 3000 g/mol, preferably of 250 g/mol to 2500 g/mol, having a hydroxyl group content of 1% to 21% by weight, preferably 2% to 18% by weight, of the kind producible in a manner known per se by reaction of polyhydric alcohols with deficit amounts of polybasic carboxylic acids, corresponding carboxylic anhydrides, corresponding polycarboxylic esters of lower alcohols, or lactones.

Suitable polyether polyols are, for example, those having an average molecular weight, calculable from functionality and hydroxyl number, of 200 g/mol to 6000 g/mol, preferably 250 g/mol to 4000 g/mol, having a hydroxyl group content of 0.6% to 34% by weight, preferably 1% to 27% by weight, as obtainable in a manner known per se by alkoxylation of suitable starter molecules. These polyether polyols may be produced using any desired polyhydric alcohols, for example those of molecular weight range 62 g/mol to 400 g/mol.

Suitable polyacrylate polyols are, for example, those having an average molecular weight, calculable from functionality and hydroxyl number or determinable by gel permeation chromatography (GPC), of 800 to 50 000, preferably of 1000 to 20 000, having a hydroxyl group content of 0.1% to 12% by weight, preferably 1 to 10, as producable in a manner known per se by copolymerization of olefinically unsaturated monomers containing hydroxyl groups with hydroxyl-free olefinic monomers.

Examples of suitable monomers for producing the polyacrylate polyols are vinyl and vinylidene monomers such as, for example, styrene, α-methylstyrene, o- and/or p-chlorostyrene, o-, m- or p-methylstyrene, p-tert-butylstyrene, acrylic acid, acrylonitrile, methacrylonitrile, acrylic and methacrylic esters of alcohols having up to 18 carbon atoms, such as methyl acrylate, ethyl acrylate, n-propyl acrylate, isopropyl acrylate, n-butyl acrylate, isobutyl acrylate, tert-butyl acrylate, amyl acrylate, hexyl acrylate, 2-ethylhexyl acrylate, isooctyl acrylate, 3,3,5-trimethylhexyl acrylate, stearyl acrylate, lauryl acrylate, cyclopentyl acrylate, cyclohexyl acrylate, 4-tert-butylcyclohexyl acrylate, isobornyl acrylate, methyl methacrylate, ethyl methacrylate, n-propyl methacrylate, isopropyl methacrylate, butyl methacrylate, isobutyl methacrylate, tert-butyl methacrylate, amyl methacrylate, hexyl methacrylate, 2-ethylhexyl methacrylate, isooctyl methacrylate, 3,3,5-trimethylhexyl methacrylate, stearyl methacrylate, lauryl methacrylate, cyclopentyl methacrylate, cyclohexyl methacrylate, 4-tert-butylcyclohexyl methacrylate, norbornyl methacrylate or isobornyl methacrylate, diesters of fumaric acid, itaconic acid or maleic acid with alcohols having 4 to 8 carbon atoms, acrylamide, methacrylamide, vinyl esters of alkanemonocarboxylic acids having 2 to 5 carbon atoms, such as vinyl acetate or vinyl propionate, hydroxyalkyl esters of acrylic acid or methacrylic acid having 2 to 5 carbon atoms in the hydroxyalkyl radical, such as 2-hydroxyethyl, 2-hydroxypropyl, 3-hydroxypropyl, 3-hydroxybutyl, 4-hydroxybutyl, trimethylolpropane monoacrylate or monomethacrylate or pentaerythritol monoacrylate or monomethacrylate, and also any desired mixtures of such exemplified monomers.

In particular, the compounds mentioned above as solvents for the trimerization catalyst B are also suitable for use as a flexibilizing component. These compounds can thus fulfill a dual function.

Preferred isocyanate-reactive compounds especially include those which do not contribute to a significant increase in the viscosity of the reaction mixture as defined above but allow the reaction mixture to be processed within the viscosity limits defined above at the injection temperature.

Additive D

The reaction mixture preferably contains at least one additive D selected from the group consisting of stabilizers including against UV light, antioxidants, water scavengers, leveling agents, rheology additives, slip additives, defoamers, wetting and dispersing agents, adhesion promoters, corrosion inhibitors, flame retardants, nanoparticles, fillers, also in the form of inorganic or organic fibers, dyes and pigments.

Suitable UV stabilizers can preferably be selected from the group consisting of piperidine derivatives such as 4-benzoyloxy-2,2,6,6-tetramethylpiperidine, 4-benzoyloxy-1,2,2,6,6-pentamethylpiperidine, bis(2,2,6,6-tetramethyl-4-piperidyl) sebacate, bis(1,2,2,6,6-pentamethyl-1-4-piperidinyl) sebacate, bis(2,2,6,6-tetramethyl-4-piperidyl) suberate, bis (2,2,6,6-tetramethyl-4-piperidyl) dodecanedioate; benzophenone derivatives such as 2,4-dihydroxybenzophenone, 2-hydroxy-4-methoxybenzophenone, 2-hydroxy-4-octoxybenzophenone, 2-hydroxy-4-dodecyloxybenzophenone or 2,2'-dihydroxy-4-dodecyloxybenzophenone; benzotriazole derivatives such as 2-(2H-benzotriazol-2-yl)-4,6-di-tert-pentylphenol, 2-(2H-benzotriazol-2-yl)-6-dodecyl-4-methylphenol, 2-(2H-benzotriazol-2-yl)-4,6-bis(1-methyl-1-phenylethyl)phenol, 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol, 2-(2H-benzotriazol-2-yl)-6-(1-methyl-1-phenylethyl)-4-(1,1,3,3-tetramethylbutyl) phenol, isooctyl 3-(3-(2H-benzotriazol-2-yl)-5-(1,1-dimethylethyl)-4-hydroxyphenylpropionate), 2-(2H-benzotriazol-2-yl)-4,6-bis(1,1-dimethylethyl)phenol, 2-(2H-benzotriazol-2-yl)-4,6-bis(1-methyl-1-phenylethyl)phenol, 2-(5-chloro-2H-benzotriazol-2-yl)-4,6-bis(1,1-dimethylethyl)phenol; oxalanilides such as 2-ethyl-2'-ethoxyoxalanilide or 4-methyl-4'-methoxyoxalanilide; salicylic esters such as phenyl salicylate, 4-tert-butylphenyl salicylate, 4-tert-octylphenyl salicylate; cinnamic ester derivatives such as methyl α-cyano-β-methyl-4-methoxycinnamate, butyl α-cyano-β-methyl-4-methoxycinnamate, ethyl α-cyano-β-phenylcinnamate, isooctyl α-cyano-β-phenylcinnamate; and malonic ester derivatives, such as dimethyl 4-methoxybenzylidenemalonate, diethyl 4-methoxybenzylidenemalonate, dimethyl 4-butoxybenzylidenemalonate. These preferred UV stabilizers may be used either individually or in any desired combinations with one another.

One or more of the UV stabilizers recited by way of example are optionally added to the composition preferably in amounts of 0.001% to 3.0% by weight, particularly preferably 0.01% to 2% by weight, calculated as the total amount of employed UV stabilizers based on the total weight of the polyisocyanate component A. Combinations of UV absorbers and free-radical scavengers are preferred, in particular free-radical scavengers belonging to the group of sterically hindered light stabilizers ("HALS").

Suitable antioxidants are preferably sterically hindered phenols, which may preferably be selected from the group consisting of 2,6-di-tert-butyl-4-methylphenol (ionol), pentaerythritol tetrakis(3-(3,5-di-tert-butyl-4-hydroxyphenyl) propionate), octadecyl 3-(3,5-di-tert-butyl-4-hydroxyphenyl)propionate, triethylene glycol bis(3-tert-butyl-4-hydroxy-5-methylphenyl)propionate, 2,2'-thiobis(4-methyl-6-tert-butylphenol), and 2,2'-thiodiethyl bis[3-(3,5-di-tert-butyl-4-hydroxyphenyl)propionate]. These may be used as required either individually or in any desired combinations with one another.

These antioxidants are preferably used in amounts of 0.01% to 3.0% by weight, particularly preferably 0.02% to 2.0% by weight, calculated as the total amount of employed antioxidants based on the total weight of the polyol component A.

In order to prevent premature crosslinking of the alkoxysilyl groups when using alkoxysilyl-containing polyisocyanates it may be advantageous to add water scavengers, for example orthoformic esters, for example triethyl orthoformate, or vinylsilanes, for example vinyltrimethoxysilane. These water scavengers are employed, if at all, in amounts of 0.01% by weight to 5% by weight, preferably of 0.01% by weight to 2% by weight, based on the total amount of the polyisocyanate component A.

To improve substrate wetting the reaction mixtures according to the invention may optionally contain suitable leveling agents, for example organically modified siloxanes, for example polyether-modified siloxanes, polyacrylates and/or fluorosurfactants. These leveling agents are employed, if at all, in amounts of 0.01% by weight to 3% by weight, preferably of 0.01% by weight to 2% by weight, particularly preferably of 0.05% to 1.5% by weight, based on the total amount of the reaction mixture.

To optimize flow behavior of the reaction mixture may contain rheology additives, for example colloidal silica, very finely divided bentonites, microcrystalline polyethylene waxes, polyamide dispersions and/or crystalline ureas.

The slip additives, defoamers, fillers and/or pigments which are likewise optionally present in the coating compositions according to the invention as further auxiliary and additive substances are known to those skilled in the art and are employed, if at all, in the amounts customary in coatings technology. A comprehensive overview of such suitable auxiliary and additive substances may be found for example in Bodo Müller, "Additive kompakt", Vincentz Network GmbH & Co KG (2009).

Production of the Reaction Mixture According to the Invention

The components of the reaction mixture according to the invention are mixed via automated metering and mixing apparatuses immediately before filling of the cavity in the reaction injection molding (RIM) process. It is preferable when the reaction mixture is provided in two or three components in suitable reservoir vessels and subjected to mechanical metering from the reservoir vessels. The individual components are preferably already temperature-controlled, either distinctly or all in the same way, such that the desired injection temperature of the mixture is easily achievable. Depending on the desired injection method the components in the reservoir vessels may already be provided under elevated pressure.

If in the RIM process one apparatus is always to used to produce the same coatings, two-component provision is preferred. The polyisocyanate mixture A and the trimerization catalyst B are then preferably provided in different reservoir vessels. In this case component B is preferably also admixed with the additive component D and, if present, the optional isocyanate-reactive compound C. In this embodiment, the reaction mixture is formed only during injection of the components into the mold.

If, by contrast, the RIM process is to be used to produce frequently changing coatings, for example coatings having different colors or effects, three-component provision is preferred. The polyisocyanate mixture A and the trimerization catalyst B are once again preferably provided in different reservoir vessels.

As the third component in each case at least a portion of the additive component D and optionally a portion of the optional isocyanate-reactive compound C is provided in further reservoir vessels. The third component may then be present in different forms, for example colors and/or effects, in different reservoir vessels and these may be used to effect a rapid color and/or effect change with a 3K RIM apparatus known per se. The component containing the trimerization catalyst B may also be admixed with portions of the components D and C.

In a particularly preferred embodiment, the third component contains a color and/or effect pigment paste containing at least one polyester or polyether polyol (component C) and at least one dispersant (component D).

Production of the individual components is carried out according to customary methods of coatings technology for two-component or multi-component polyurethane coatings, for example by mixing in stirred vessels or in the presence of solids such as pigments in dispersing apparatuses such as dissolvers or pasting apparatuses such as bead mills.

Coating of Workpieces by Reaction Injection Molding

When using the reaction mixture for coating workpieces by reaction injection molding the workpiece, which serves as a support for the coating to be built up, is introduced into a mold which at least partially surrounds the workpiece. It is preferable when the mold is heatable because such simple heating of the mold can be used to bring about curing of the reaction mixture. The inside of the mold which faces the workpiece and comes into contact with the reaction mixture may be structured in order thus to produce a structure on the surface of the coating to be built up.

The workpiece contains at least one material selected from the group consisting of plastics, composites, for example fiber-reinforced plastics, electronic articles, wood, natural stone and metal. It preferably consists to an extent of least 90% by weight of one or more of the aforementioned materials. Preferred plastics are selected from the group consisting of ABS, AMMA, ASA, CA, CAB, COC, EP, UF, CF, MF, MP, PF, PAN, PA, PBS, PC, PE, PE-HD, PE-LD, PE-LLD, PE-UHMW, PPS, PET, PEEK, PLA, PMMA, PP, PS, PPS, SB, PUR, PVC, SAN, PBT, PPE, POM, PP/EDP, UP (abbreviated designations according to DIN EN ISO 1043-1:2016), polyoxazolidinones, thermoplastic polyurethane, melamine-phenol-formaldehyde and mixtures thereof. Both homo- and copolymers of the abovementioned plastics/mixtures thereof are suitable. Preferred mixtures are PC+ABS, PC+PBT and PC+PET. It is particularly preferable when the workpiece to be coated consists to an extent of at least 90% by weight of a thermoplastic polymer. The workpiece may optionally be pretreated. Examples of pretreated workpieces include adhesion promoted workpieces, metalized workpieces, printed workpieces, decorative film covered workpieces, labeled workpieces, stained, colored and/or primed workpieces made of wood.

A workpiece to be coated need not necessarily consist of a single component. In a preferred embodiment of the present invention, the surface of the article to be coated has at least one further component present on it which is then likewise at least partially surrounded by the mold. This further component is preferably selected from the group consisting of sensors, illuminant elements and actuators.

It is further preferred when the workpiece to be coated contains recesses of any desired geometry. This is shown schematically in FIG. 1. The workpiece (diagonally hatched) contains a cutout (grey). When such a cutout, together with the surrounding parts of the workpiece to be coated, is surrounded by the mold and coated a coating covering the cutout (black) and at least a portion of the workpiece is formed. After coating a further article (horizontally hatched) may then be introduced into the cutout and, together with the workpiece, is covered by a unitary and undamaged coating. Preferred articles are selected from the group consisting of sensors, illuminant elements and actuators.

A cavity remains between the inside of the mold and the surface of the workpiece surrounded by the mold. The reaction mixture is then introduced into the cavity. Complete mixing of all components of the reaction mixture may be effected before introduction but may for example also be effected by suitable mixing assemblies during introduction. Mixing and introduction of the reaction mixture is preferably effected using RIM apparatuses, such as are commercially available for example from Isotherm AG, Uetendorf, CH, for example under the designation PSM 90 or PSM 3000, from KraussMaffei Group, DE under the process/technology designation ColorForm and from Hennecke GmbH, Sankt Augustin, DE under the process/technology designation ClearRIM. KraussMaffei Group, DE, also offers optional color modules for the ColorForm system which can operate with three components and thus allow rapid color changes for example.

The distance between the inside of the mold and the surface of the workpiece to be coated is preferably between 50 μm and 5 mm. This distance is preferably determined along the surface normal of the surface of the workpiece.

The coating preferably has an extent of at least 10 mm along at least one axis of a two-dimensional Cartesian coordinate system.

The filling of the cavity with the reaction mixture is preferably carried out at a pressure which is elevated relative to ambient pressure. The pressure in the cavity likewise remains elevated relative to ambient pressure during the curing operation.

When the cavity is completely filled with the reaction mixture said mixture is cured by the elevated temperature present there until the coated workpiece is demoldable. The inside of the mold preferably has a temperature between 60° C. and 300° C. The coated workpiece can then be removed from the mold. It will be appreciated that the aforementioned upper temperature limit during curing is dependent on the constitution of the workpiece to be coated. If the workpiece is damaged at a particular temperature, the temperature during curing must be below this value. For workpieces containing or consisting of thermoplastic polymers the upper limit is preferably 130° C., more preferably 100° C. To ensure sufficiently rapid curing a preferred lower limit of temperature is 80° C.

According to the invention this allows buildup of a coating by an automated process. Since the curing of the reaction mixture is effected by reaction of isocyanate groups with one another, wherein according to the invention the isocyanate groups are in marked excess, and not predominantly by reaction of two different functional groups, the reaction mixture is less susceptible to mixing errors than two-component systems. Mechanical or chemical pre-treatment of the mold to be coated is generally unnecessary. Even workpieces with more complex geometry, where applying a coating by conventional processes is possible only with difficulty, are thus easy to coat. Since the curing of the coating composition is effected inter alia through formation of isocyanurate groups the resulting coatings have high mechanical and chemical stability. When the polyisocyanate composition A contains only small proportions, if any, of aromatic isocyanates, coatings that are very resistant to weathering are obtainable.

In a further embodiment, the present invention relates to a process for coating a workpiece comprising the steps of a) introducing a workpiece into a mold which surrounds at least a portion of the workpiece and has dimensions such that the distance between the surface of the workpiece and the inside of the mold corresponds to the thickness of the coating;
b) injecting at least one reaction mixture having a molar ratio of isocyanate groups to isocyanate-reactive groups of at least 3:1 containing
   (i) at least one polyisocyanate composition A and
   (ii) at least one trimerization catalyst B into the cavity between the workpiece and the forming tool; and
c) curing the reaction mixture injected in process step b) at a temperature between 60° C. and 300° C., wherein at least 30 mol % of the free isocyanate groups present at commencement of process step c) are converted.

All of the aforementioned definitions for the reaction mixture and its components and also the use also apply to this embodiment.

The introduction of the workpiece into the mold may be effected in any manner known to those skilled in the art in the field of reaction injection molding. There is a cavity between the surface of the workpiece to be coated and the inside of the mold at at least one point. This serves to accommodate the reaction mixture in process step b). Its thickness, i.e. the distance between the surface of the workpiece and the inside of the mold, determines the layer thickness of the coating formed. The configuration of the inside of the mold can be used to determine the structure of the surface of the coating formed. The mold surrounds a portion of the workpiece such that the cavity is outwardly sealed and the reaction mixture injected via valves or other suitable apparatuses cannot flow out of the cavity.

In process step b) at least one reaction mixture is injected into the cavity. This may be effected in any manner known to those skilled in the art in the field of reaction injection molding. Depending on the reactivity of the reaction mixture used the reaction mixture may be in a reservoir container in premixed form. This is preferred for reaction mixtures having a low reactivity at room temperature.

However, if the reactivity at room temperature is excessively high, the polyisocyanate A and the trimerization catalyst B are preferably stored in separate vessels and mixed only during injection. Suitable valves, nozzles and mixing heads are well known to those skilled in the art from the field of two-component polyurethane systems.

Compared to the aforementioned two-component polyurethane system, the process according to the invention is less susceptible to mixing errors: Varying the stoichiometry of the catalyst and the isocyanate affect the rate of curing but not the properties of the finished coating. By contrast, varying the stoichiometric ratio of NCO groups and OH groups in known polyurethane systems necessarily results in materials having altered properties.

Once the cavity has been completely filled in process step b) the temperature of the reaction mixture is raised to at least 60° C. in process step. Selection of a suitable temperature depends on the sensitivity of the workpiece to be coated. The curing temperature must not become high enough to result in damage to the workpiece. However, within this range the selection of relatively high temperatures is in principle preferred to achieve rapid curing and associated short cycle times. An absolute upper limit for the curing temperature in the process according to the invention is set by the material formed from the reaction mixture itself: Polyisocyanurate plastics decompose at temperatures above 300° C., and so during process step c) this value is only exceeded for not more than 5 seconds, but preferably not at all. Particularly suitable temperature ranges are disclosed hereinabove.

Process step c) is performed until the coated workpiece is demoldable. The term "demoldable" describes a state of the workpiece in which it may be removed from the mold without residues of the reaction mixture remaining adhered to the inside of the mold. However, it is not necessary for all isocyanate groups to have reacted. It is preferable when at the end of process step c) between 15% and 85%, more preferably between 30% and 75%, and particularly preferably 40% to 75% of the isocyanate groups present at commencement of process step c) have reacted. Conversely, at the end of process step c) between 5% and 85%, more preferably between 25% and 70% and particularly preferably 25% to 60% of the originally present isocyanate groups are present.

In a preferred embodiment of the present invention, at least 40 mol %, preferably at least 50 mol % and most preferably at least 50 mol % of the free isocyanate groups present at commencement of process step c) are converted into isocyanurate groups. The result is a coating whose crosslinking is largely mediated via isocyanurate groups. Such coatings feature superior resistance to chemical and physical influences.

The crosslinking of the free isocyanate groups still present after termination of process step c) is effected outside the mold and preferably at temperatures between 10° C. and 120° C. As a result, in a preferred embodiment of the present invention, process step c) in the process according to the invention is followed by a process step in which the isocyanate groups still present at the end of process step c) are subjected to further crosslinking outside the mold at a temperature between 10° C. and 120° C., preferably between 10° C. and 40° C. This process step is preferably performed until at least 95% of the isocyanate groups present at commencement of process step c) have reacted.

Process step c) is preferably performed for 10 seconds to 900 seconds, more preferably for 10 seconds to 180 seconds and yet more preferably for 10 seconds to 90 seconds. In this context "performing" is to be understood as meaning that the reaction mixture is in contact with the inside of the mold for this period of time and said inside has a temperature between 60° C. to 300° C.

At the end of process step c) the coating preferably has a Tg of 40° C. to 300° C., more preferably 60° C. to 180° C.

In a preferred embodiment of the present invention, the workpiece consists to an extent of at least 90% by weight of a thermoplastic and process step a) is preceded by a process step of producing said workpiece by injection molding. It is preferable when not more than 5 minutes, preferably not more than 30 seconds, elapse between the process step of producing the workpiece consisting of a thermoplastic polymer by injection molding and commencement of process step a).

In a further embodiment, the present invention relates to a coating obtained or obtainable by the above-defined process according to the invention.

In infrared spectrometric analysis this coating according to the invention features a ratio of the absolute peak heights of the $CH_2$ band and the NH-5 band of at least 0.85:1 at a simultaneous ratio of the absolute peak heights of the isocyanurate band and the NH-5 band of at least 5.5:1. For each band the greatest absolute intensity was determined in each case. The measurement range for $CH_2$ was between 2900 and 3000 $cm^{-1}$, for NH-δ between 1480 and 1600 $cm^{-1}$ and for isocyanate between 1590 and 1700 $cm^{-1}$. These properties are present when at least 95% of the isocyanate groups originally present in the reaction mixture at commencement of process step c) have reacted. This point may have been reached immediately after process step c), especially when performed for a long time at high temperatures. However, the abovementioned conversion is generally achieved by a combination of the curing in process step c) and a post-curing outside the mold at the defined therefor in this application. If the above conditions are met, the Tg of the coating is 40° C. to 300° C., preferably 60° C. to 180° C.

In a preferred embodiment, the coating is free from pigments and has a Hazen color number of not more than 50, preferably not more than 30. Hazen color numbers are preferably determined using a micro-haze plus instrument from Byk-Gardner GmbH, Geretsried, Germany at an angle of 20°.

The coating preferably has a density of at least 0.95 $g/cm^3$.

In yet a further embodiment, the present invention relates to a workpiece coated with the coating defined above.

Such workpieces are preferably electrical devices, furniture, toys or wooden or plastic articles for automobiles or airplanes.

FIG. 1A shows a workpiece (diagonally hatched) having a cutout (grey) viewed from above.

FIG. 1B shows a cross section of the workpiece having a cutout.

FIG. 1C shows the cross section of the workpiece after coating. The workpiece and the cutout are now covered by the coating (black).

FIG. 1D shows a coated workpiece where an article (hatched horizontally) was inserted into the originally present cutout.

The working examples which follow serve merely to illustrate the invention. They are not intended to limit the scope of protection of the claims in any way.

WORKING EXAMPLES

The tests were carried out on a Battenfeld HM 370/1330 injection molding machine combined with a laboratory piston metering system for 2 components. The mold used was an A5 plate mold which was coated with a mass of about 41 g of lacquer which corresponds to a lacquer layer thickness of 280 μm to 390 μm.

The following materials were used:

Desmophen XP 2488, branched polyester polyol available from Covestro Deutschland AG having the following properties:

| | | |
|---|---|---|
| Hazen color number | ≤100 | |
| Acid number | ≤4.0 | mg KOH/g |
| Viscosity at 23° C. | 12 250 ± 1 750 | mPa s |
| Hydroxyl content | 16.0 ± 0.6 | % |
| Water content | ≤0.1 | % |
| Equivalent weight | about 105 | g/eq |
| Density at 20° C. | about 1.12 | g/cm³ |
| Flashpoint | about 127 | ° C. |

Desmophen C1100, linear, aliphatic polycarbonate polyester available from Covestro Deutschland AG having the following properties:

| | | |
|---|---|---|
| Hazen color number | ≤150 | |
| Acid number | about 0.1 | mg KOH/g |
| Viscosity at 23° C. | 3 200 ± 1 300 | mPa s |
| Hydroxyl content | 3.3 ± 0.3 | % |
| Water content | about 0.05 | % |
| Equivalent weight | about 515 | g/eq |
| Density at 20° C. | about 1.1 | g/cm³ |
| Solidification temperature | about 15 | ° C. |

Polyisocyanate B1

The isocyanurate-containing HDI polyisocyanate B1 was produced according to EP-A 330 966, example 11, wherein 2-ethylhexanol was employed as the catalyst solvent instead of 2-ethyl-1,3-hexanediol. Removal of the excess monomeric HDI by thin-film distillation afforded an HDI polyisocyanate having an NCO content of 22.9%, a viscosity of 1200 mPas at 23° C. and an average NCO functionality of 3.1 (calculated from NCO content and number-average molecular weight determined by GPC measurement).

Makrolon 2405/901510, black polycarbonate

The catalyst was produced according to EP 333 7836, example 1a.

The following materials were used for the lacquer:

Component A

| | |
|---|---|
| Desmophen C1100 | 20.6 g |
| Desmophen XP 2488 | 8.8 g |
| Catalyst | 3.0 g |

The polyols Desmophen C1100 and Desmophen XP 2488 were used in a mass ratio of 70:30. The employed amount of catalyst corresponds to a concentration of 2.91% by weight based on he total mass (component A +component B), calculated for a degree of crosslinking of 3.

Component B: Polyisocyanate B1, amount see table 1.

Both components were heated to about 90° C. before the test. The surface temperature of the mold was 117° C. The thermoplastic was melted in the extruder at 290° C. and injected into the mold at an established mold temperature of 120° C. The experimental release agent L9500021 from Votteler was applied manually to the plate mold, but any external release agent for polyurethane systems is suitable in principle.

Different degrees of crosslinking were used for the coating of the test panels. The degree of crosslinking was calculated based on the theoretical isocyanate and OH contents:

Degree of crosslinking 1=ratio of NCO groups to OH groups of 1:1

Degree of crosslinking 3=ratio of NCO groups to OH groups of 3:1

The following parameters were used for the coating tests:

TABLE 1

Overview of employed mixing ratios of polyol (A) to isocyanate (B), degrees of crosslinking achieved therewith and parameters established

| No. | Degree of crosslinking | Mixing ratio A:B (volume) | Temperature Material A/B | Mold closing time |
|---|---|---|---|---|
| 1 (comp.) | 1.3 | 100:100 | 90/90 | 90 s |
| 2 | 2 | 100:145 | 90/90 | 90 s |
| 3 | 3 | 100:215 | 90/90 | 90 s |
| 4 | 4 | 100:285 | 90/90 | 90 s |
| 5 | 5 | 100:360 | 90/90 | 90 s |
| 6 | 6 | 100:430 | 90/90 | 90 s |

At least 6 parts were produced for each degree of crosslinking.

For each degree of crosslinking the residual NCO content for at least one article was determined by IR after the following times. To this end, an unreacted mixture of components A and B mixed at room temperature according to the degree of crosslinking was measured and the peak for the NCO group contained therein at about 2200 $cm^{-1}$ was normalized to 100%.

Measurements were made on a Bruker Tensor II infrared spectrometer using a Platinum ATR unit. The spectrometer was controlled with the instrument software OPUS Version 7.5, which was also used for the evaluation. After baseline correction (rubber band method) and normalization to $CH_2$/$CH_3$ (min-max normalization in the range 2800-3000 $cm^{-1}$) a straight line was applied between 2380 $cm^{-1}$ and 2170 $cm^{-1}$ for area integration and the area thereabove calculated.

TABLE 2

Overview of percentage content of residual NCO in articles having different degrees of crosslinking measured after different time intervals When the average value was below 5%, development was not pursued further.

| Degree of crosslinking | 3 h | 1 day | 1 week | 2 weeks | 2 weeks + 16 h @ 60° C. |
|---|---|---|---|---|---|
| 1.3 | 0.00% | 0.00% | | | |
| 2 | 0.38% | 0.65% | 0.00% | | |
| 3 | 11.72% | 7.83% | 2.89% | 2.14% | |
| 4 | 20.80% | 15.51% | 9.32% | 7.39% | 3.57% |
| 5 | 39.01% | 22.43% | 15.53% | 10.57% | 3.24% |
| 6 | 43.48% | 25.37% | 17.11% | 12.73% | 4.48% |

The ratios of the absolute peak heights of different signals were also compared, wherein in each case the greatest absolute intensity of the band was determined. The measurement range for $CH_2$ was between 2900 and 3000 $cm^{-1}$, for NH-5 between 1480 and 1600 $cm^{-1}$ and for isocyanate between 1590 and 1700 $cm^{-1}$. The peak heights were correspondingly related to the other signal. Exclusively fully cured articles were used for this investigation, i.e. the measurements were carried out about 6 months after production. An overview is shown in table 3.

TABLE 3

Overview of ratios of peak heights of CH2 to NH-δ and isocyanurate to NH-δ for different degrees of crosslinking.

| Degree of crosslinking | CH2:NH-δ ratio | Isocyanurate:NH-δ ratio |
|---|---|---|
| 1.3 | 0.81 | 3.81 |
| 2 | 0.80 | 4.56 |
| 3 | 0.84 | 5.5 |
| 4 | 0.85 | 5.82 |
| 5 | 0.90 | 6.16 |
| 6 | 0.89 | 6.05 |

The following coatings technology tests were carried out on the lacquers:

Hazen color numbers were determined using a micro-haze plus instrument from Byk-Gardner GmbH, Geretsried, Germany at an angle of 20°.

The gloss of obtained coatings was measured by reflectometry according to DIN EN ISO 2813:2014 at an angle of 20°.

Glass Transition Temperature (TG) by Differential Scanning Calorimetry (DSC)

The measurements were performed using a Perkin Elmer DSC 8500 calorimeter. Temperature calibration was carried out on indium and lead (melt onset) and heat of reaction calibration was carried out on indium (melt area integral). Three heatings from −65° C. to +150° C. were performed at a heating rate of 20 K/min. Between heatings the sample was cooled at a cooling rate of 320 K/min. The measurements were performed under nitrogen and a closed aluminum crucible was used as the sample vessel for solid samples.

Solvent Resistance

A small amount of the relevant solvent (xylene, 1-methoxyprop-2-yl acetate (MPA), ethyl acetate or acetone) was added to a test tube and provided with a cotton pad at the opening, so that an atmosphere saturated with solvent was formed inside the test tube. The test tubes were then applied to the lacquer surface by the cotton pad and remained there for 5 minutes. After wiping off the solvent, the film was examined for damage/softening/loss of adhesion and visually assessed from 0 (no change) to 5 (lacquer surface destroyed).

Pendulum damping was measured after König according to DIN EN ISO 1522 (01-04-2007 edition), wherein the test panels are described according to DIN 1514.

Cross-cut adhesion tests were carried out according to DIN EN ISO 2409 (01-09-2019 edition) with a grid line spacing of 3 mm.

Sun cream resistance was determined based on the Ford test USA PV 3964 (Engineering Material Specification/Soiling and Cleanability FLTM BN 112-08, ISO 105-A02/AATCC). The sun cream was applied to the lacquer surface to be tested and then stored at 70° C. for 4 hours. The test surfaces were wiped off with a cosmetic tissue immediately after exposure. After wiping off the sun cream, the film was checked for destruction/softening/loss of adhesion and visually assessed from 0 (no change) to 5 (lacquer surface destroyed).

TABLE 4

Overview of test results on direct coating articles having different degrees of crosslinking. The tests were performed as described above.

| | No. | | | | | |
|---|---|---|---|---|---|---|
| | 1 (comp.) | 2 | 3 | 4 | 5 | 6 |
| Degree of crosslinking | 1.3 | 2 | 3 | 4 | 5 | 6 |
| Gloss 20° [GU] | 81 | 85 | 86 | 85 | 87 | 80 |
| Haze 20° | 21 | 18 | 21 | 19 | 24 | 47 |
| TG [° C.] | 12 | 34 | 50 | 65 | 77 | 82 |
| Pendulum damping [s] | 13 | 68 | 162 | 176 | 182 | 186 |
| Cross-hatch | 3 | 2 | 1 | 1 | 1 | 1 |
| Solvent resistance 1 minute Xylene/ MPA/ethyl acetate/ acetone | 3/3/3/3 | 3/3/3/3 | 2/1/2/2 | 2/1/2/2 | 2/1/2/2 | 2/1/2/2 |
| Sun cream resistance | 4 | 4 | 4 | 1-2 | 1 | 1 |

The evaluation of the data reported in table 4 shows that a higher degree of crosslinking is correlated with a higher glass transition temperature TG and a higher pendulum damping. It is also apparent that the properties of the lacquer surfaces in respect of resistance to sun cream and solvents improve with increasing degree of crosslinking. The jump in properties is particularly evident above a degree of crosslinking of 3.

The invention claimed is:

1. Method for coating workpieces by reaction injection molding by providing a reaction mixture having a molar ratio of isocyanate groups to isocyanate-reactive groups of at least 3:1, wherein the reaction mixture contains a) at least one polyisocyanate composition A and b) at least one trimerization catalyst B wherein at least 30 mol % of free isocyanate groups present in the reaction mixture are converted into isocyanurate groups during the reaction injection molding process.

2. The method as claimed in claim 1, wherein the reaction mixture additionally contains at least one isocyanate-reactive compound selected from the group consisting of mono- or polyhydric alcohols, amines, amino alcohols and thiols.

3. The method as claimed in claim 1, wherein the polyisocyanate composition A consists to an extent of at least 70% by weight, based on its total weight, of polyisocyanates which comprise exclusively aliphatically and/or cycloaliphatically bonded isocyanate groups.

4. The method as claimed in claim 1, wherein the polyisocyanate composition A contains at least one blocked polyisocyanate whose blocking agent is selected from the group consisting of lactams, oximes, cyclopentanone 2-alkyl esters and phenols.

5. The method as claimed in claim 1, wherein the workpieces consists of at least one material selected from the group consisting of thermoplastic polymers, thermosetting polymers, wood and metal.

6. The method of claim 1, wherein a coating formed on the workpiece by the reaction injection molding process is a polyisocyanurate plastic.

7. A process for coating a workpiece, comprising the steps of a) introducing a workpiece into a mold which surrounds at least a portion of the workpiece and has dimensions such that a distance between a surface of the workpiece and an inside of the mold corresponds to a thickness of a coating;

b) injecting at least one reaction mixture as defined in claim 1; and c) curing the reaction mixture injected in process step b) at a temperature between 60° C. and 300° C., wherein at least 30 mol % of the free isocyanate groups present at commencement of process step c) are converted into isocyanurate groups.

8. The process as claimed in claim 7, wherein process step c) is performed at a temperature between 80° C. and 130° C.

9. The process as claimed in claim 7, wherein process step c) is performed for 10 seconds to 900 seconds and the coated workpiece is demoldable.

10. The process as claimed in claim 7, wherein the workpiece to be coated consists to an extent of at least 90% by weight of a thermoplastic and said workpiece was produced by injection molding not more than 5 minutes before commencement of process step a).

11. The process as claimed in claim 7, wherein the distance between the surface of the workpiece and the inside of the mold is 50 μm to 5 mm.

12. The process as claimed in claim 7, wherein the polyisocyanate composition A contains at least one silane-functional polyisocyanate.

13. A coating obtained or obtainable by the process according to claim 7.

14. The coating as claimed in claim 13, wherein a ratio of an absolute peak heights of a $CH_2$ band and an NH-δ band is at least 0.85:1 and a ratio of an absolute peak heights of an isocyanurate band and the NH-δ band is at least 5.5:1 and the coating has a Tg of 40° C. to 300° C.

15. The coating as claimed in claim 13, having a density of at least 0.95 $g/cm^3$.

16. A workpiece coated with the coating as claimed in claim 13.

* * * * *